United States Patent [19]

Labouygues

[11] 4,126,947
[45] Nov. 28, 1978

[54] SETTLING AND DRYING APPARATUS

[76] Inventor: Jean Labouygues, 2 Cours Sablon, 63000 Clermont Ferrand, France

[21] Appl. No.: 810,926

[22] Filed: Jun. 29, 1977

[51] Int. Cl.$^2$ ............................................. F26B 19/00
[52] U.S. Cl. .......................................... 34/69; 34/165; 34/189
[58] Field of Search .................... 34/69, 71, 128, 124, 34/147, 165, 189, 14; 209/155

[56] References Cited

U.S. PATENT DOCUMENTS 556,129   3/1896   Barbeau .............................. 34/147 X Primary Examiner—Edgar W. Geoghegan
Attorney, Agent, or Firm—Poms, Smith, Lande & Glenny

[57] ABSTRACT

The invention relates to a settling and drying apparatus composed of a settling tank in whose center is immersed a tube of an annular supply tank with central overflow comprising, coaxially, an extractor tube plunging to the bottom of the tank and surmounted by a drying tank.

6 Claims, 2 Drawing Figures

SETTLING AND DRYING APPARATUS

The present invention relates to a settling and drying apparatus for separating solids in suspension in a liquid, used for treating sand, ores, residual water, chemical products and like products.

In the presently known methods of treating, for example, a mixture of water and sand of granulation 0.3 mm, the various operations are carried out by a succession of machines, each having their own function:

(a) a tank, a centrifugal pump and a hydrocyclone for making the cut at around 100 microns and a preconcentration of the pulp, (b) a draining apparatus: Archimedean screw, paddle wheel, bucket elevator or shaking table for draining the 0.1-3 mm solids.

These conventional machines are very cumbersome and extremely expensive as far as investment and maintenance are concerned. In particular, the centrifugal pump must raise all the pulp (solid + water) to a considerable height and under strong pressure at the top for introduction into the hydrocyclone. The necessary drive force is very important. The centrifugal pump and the rubber-coated cyclones are expensive machinery requiring expensive spare parts which rapidly wear by the continuous action of the high speed jets of sand.

It is an object of the invention to carry out all the operations in one machine which comprises, as mobile mechanical member, only a propeller shaft of very rustic design. The installed power is very low since only the solid products are raised.

The invention therefore relates to a settling apparatus comprising a tank in which the liquid is brought by a distributor, the matter in suspension being deposited at the bottom of the tank which comprises in its upper part an evacuation of separated liquid by an overflow, wherein the distributor is an annular tank with central overflow, with inlet of liquid through a lateral, tangential conduit, the central overflow edge of the distributor tank extending in the liquid of the settling tank.

The invention will be more readily understood on reading the following description with reference to the accompanying drawings, in which.

Figure 1:
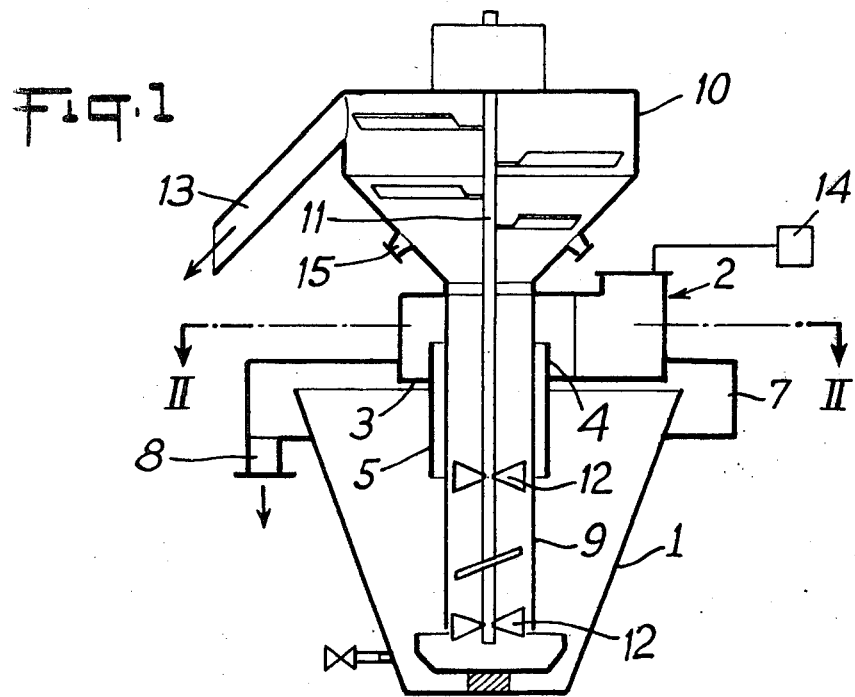
FIG. 1 is a schematic view of an apparatus according to the invention.
Figure 2:
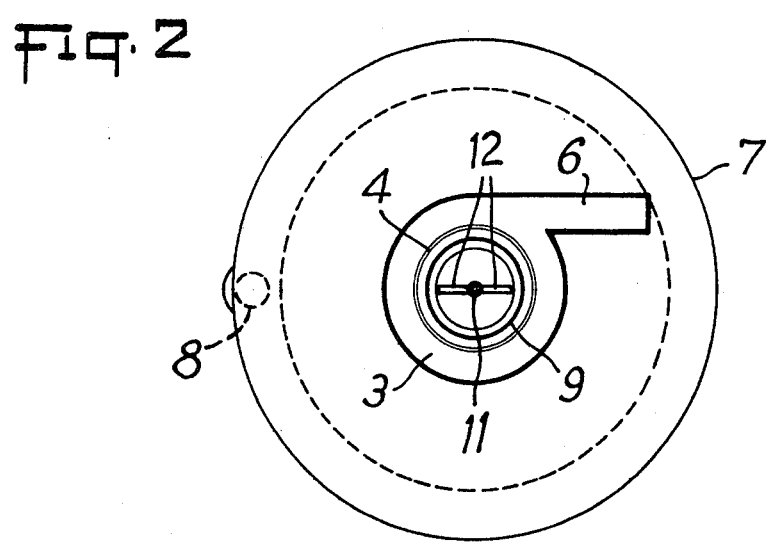
FIG. 2 is a section along II—II of FIG. 1.

Referring now to the drawings, the apparatus shown in FIGS. 1 and 2 comprises a truncated settling tank 1 in which the mixture of solids and liquids arrives through a distributor 2.

This distributor comprises an annular tank 3 with central overflow, the inner circular wall 4 of this tank forming overflow threshold and extending by a tube 5 which is immersed in the settling tank. The liquid arrives in the annular tank through a lateral, tangential conduit 6.

This distributor, placed axially with respect to the tank 1, allows a very regular supply at low speed by flow along the wall 4 and the tube 6, without disturbing the upper level of the tank 1, since the tube 6 is immersed in the bath contained in the tank 1, which comprises around its upper edge a channel 7 collecting the overflow liquid evacuated through conduit 8. Coaxially with respect to the distributor is located a tube 9 spaced internally with respect to tube 6. This tube 9 descends down to the bottom of the tank in the products of separation which are raised in this tube by an elevator or extractor, which brings these products into a reservoir tank 10 surmounting the tube 9.

The elevator is constituted by a rotating shaft 11, coaxial to tube 9 and to the reservoir tank. This shaft is provided with blades, pump, worm or any propeller devices 12 and is driven by a motor.

The solid products which are raised in the tube 9 above the overflow level of the tank 1 are in a drainage zone which continues in the reservoir tank by a draining zone.

The impulse given to the products at the base of tube 9 is sufficient in certain applications to raise them to the top of the apparatus, in the draining zone, in the form of an inversed cone where, moreover, they are retained without effort by the vault effect on the walls of the cone. This partly explains the very low power consumed.

The reservoir tank is calculated, for each application, so as to ensure the drainage and even the drying of the solid products extracted before being evacuated in the spout 13. The dwell time of the solid products in the draining zone may vary from a few minutes to several hours according to the applications and quantities treated. Consequently, the volume of the reservoir tank on which the dwell time depends may vary between a few liters and ten or 20 cubic meters, for example. Thus, in certain cases, it may act as storage hopper. By way of example, in an apparatus according to the invention, with an output of 36 tons of solid products per hour, a reservoir tank volume able to contain three tons of material corresponds to a dwell time of 5 minutes.

Moreover, the apparatus may function discontinously as far as the extraction of the solid products is concerned.

The distributor comprises a supply 14 through which reagents may be added to activate draining.

For certain application, rinsing devices may be arranged above the level of the tank 1.

Above the upper level of the tank 1, the shaft is hollow and pierced with holes through which the liquid resulting from the drainage descends to the bottom of the tank.

The tube 9 leaves a large clearance between its internal face and the propeller members 12 so that a layer of solid products is formed as a protective sheath in order to avoid contact of the metallic parts and to reduce wear and tear.

An original phenomenon which contributes an important advantage concerning the efficacy of draining must be noted.

The tube 9 and reservoir tank 10 form a type of funnel, plunging in the tank, full of liquid, this constituting a perfect water seal. In this funnel, the air can penetrate only through the upper part. Now, when the apparatus is operating, the upper part of the funnel is filled with the solid products in the course of draining. The filtrate descends rapidly in the tube 9. This results in a permanent reduced pressure in the funnel and an intake of air through the layer of solid products, which accelerates draining thereof.

This original phenomenon produces through the layer in the course of drying an effect similar to that of a vacuum pump or a fan without having to resort to these conventional machines. To increase this effect of reduced pressure, the height of the apparatus may be increased depending on the purpose envisaged. If the size of the premises does not enable the height to be increased, a supplement to the natural reduced pressure may be created artificially by using a pump or fan.

What is claimed is:

1. In a settling and drying apparatus comprising a settling tank with an overflow level, a distributor having a tangential inlet conduit for bringing a liquid with suspended solids to the settling tank, the distributor having an overflow level, overflow tube means extending from the overflow level of the distributor to below the overflow level of the settling tank for directing liquid and suspended solids which overflow from the distributor into the overflow tube toward the bottom of the tank.

2. The apparatus of claim 1 further including an extractor tube extending from near the bottom of the settling tank to a location above the overflow level of the settling tank, a reservoir mounted on the extractor tube above the overflow level of the settling tank, the reservoir having an opened bottom communicating with the extractor tube, extractor means inside the extractor tube for moving separated solids from the bottom of the settling tank through the extractor tube into the reservoir.

3. The apparatus of claim 2 wherein the extractor tube extends through the overflow tube of the distributor.

4. The apparatus of claim 2 wherein the extractor means includes a rotary shaft having blades thereon and being concentric with respect to the extractor tube.

5. The apparatus of claim 4 wherein the shaft of the extractor means passes through the reservoir, additional blades being mounted on the shaft in the reservoir for stirring the matter in the reservoir.

6. The apparatus of claim 4 wherein the shaft has means for permitting liquid draining from separated solids to flow from the reservoir through the rotary shaft to the settling tank.

* * * * *